US006436614B1

(12) United States Patent
Zhou et al.

(10) Patent No.: US 6,436,614 B1
(45) Date of Patent: Aug. 20, 2002

(54) METHOD FOR THE FORMATION OF A THIN OPTICAL CRYSTAL LAYER OVERLYING A LOW DIELECTRIC CONSTANT SUBSTRATE

(76) Inventors: Feng Zhou, 4407 Valley Ave., Apt. C, Pleasanton, CA (US) 94566; Seng-Tiong Ho, 120 Picardy La., Wheeling, IL (US) 60090

( * ) Notice: Subject to any disclaimer, the term of this patent is extended or adjusted under 35 U.S.C. 154(b) by 0 days.

(21) Appl. No.: 09/884,616

(22) Filed: Jun. 19, 2001

Related U.S. Application Data

(60) Provisional application No. 60/242,401, filed on Oct. 20, 2000.

(51) Int. Cl.[7] .............................................. B32B 31/14
(52) U.S. Cl. ........................ 430/321; 430/323; 156/254
(58) Field of Search ................................. 430/321, 323; 156/254

(56) References Cited

U.S. PATENT DOCUMENTS

| | | | |
|---|---|---|---|
| 4,846,931 A | 7/1989 | Gmitter et al. | |
| 4,883,561 A | 11/1989 | Gmitter et al. | |
| 5,073,230 A | 12/1991 | Maracas et al. | |
| 5,122,852 A | 6/1992 | Chan et al. | |
| 5,201,996 A | 4/1993 | Gmitter et al. | |
| 5,286,335 A | 2/1994 | Drabik et al. | |
| 5,344,517 A | 9/1994 | Houlding | |
| 5,391,257 A | 2/1995 | Sullivan et al. | |
| 5,641,381 A | 6/1997 | Bailey et al. | |
| 5,764,820 A | 6/1998 | De Dobbelaere et al. | |
| 5,985,742 A | 11/1999 | Henley et al. | |
| 6,010,579 A | 1/2000 | Henley et al. | |
| 6,120,597 A | 9/2000 | Levy et al. | |
| 6,159,323 A | 12/2000 | Joly et al. | |
| 6,159,824 A | 12/2000 | Henley et al. | |
| 6,159,825 A | 12/2000 | Henley et al. | |
| 6,162,705 A | 12/2000 | Henley et al. | |
| 6,204,151 B1 * | 3/2001 | Malik et al. | 438/460 |
| 6,303,468 B1 * | 10/2001 | Aspar et al. | 438/455 |

FOREIGN PATENT DOCUMENTS

| | | | |
|---|---|---|---|
| JP | 2000-077287 A | * | 3/2000 |
| WO | WO 00/48278 | * | 8/2000 |

* cited by examiner

*Primary Examiner*—John A. McPherson
(74) *Attorney, Agent, or Firm*—Townsend and Townsend and Crew LLP

(57) ABSTRACT

A method for the formation of a thin optical crystal layer (e.g., a thin LiNbO$_3$ optical single crystal layer) overlying a low dielectric constant substrate (e.g., a low dielectric constant glass substrate). The method includes implanting ions (e.g., He$^+$) through a surface of an optical crystal substrate. The implanting of the ions defines, in the optical crystal substrate, a thin ion-implanted optical crystal layer overlying a bulk optical crystal substrate. A low dielectric constant substrate is subsequently bonded to the surface, using either a direct or an indirect bonding technique, to form a bonded structure. The bonded structure is thermally annealed at a temperature in the range of 300° C. to 600° C. for 30 minutes to 300 minutes. Thereafter, the thin ion-implanted optical crystal layer and low dielectric constant substrate are separated from the bulk optical crystal substrate using mechanical force applied to the low dielectric constant substrate and/or the bulk optical crystal substrate in the direction of separation. As a result, a thin optical crystal layer overlying a low dielectric constant substrate is formed. The thin optical crystal layer has characteristics (e.g., an electro-optical coefficient, surface quality and homogeneity) that are equivalent to the optical crystal substrate, from which it originated, and is thus suitable for use in electro-optical devices. Furthermore, the low dielectric constant substrate enables the manufacturing of electro-optical devices with a reduced RF and optical wave velocity mismatch, a broad bandwidth and a low modulation or switching voltage.

25 Claims, 5 Drawing Sheets

METHOD FOR THE FORMATION OF A THIN OPTICAL CRYSTAL LAYER OVERLYING A LOW DIELECTRIC CONSTANT SUBSTRATE

CROSS-REFERENCES TO RELATED APPLICATIONS

This application claims priority from co-pending U.S. Provisional Patent Application No. 60/242,401 filed Oct. 20, 2000 entitled A TECHNIQUE FOR FABRICATING HYBRID EO PHOTONIC INTEGRATED DEVICES AND CIRCUITS, which is hereby incorporated by reference, as if set forth in full in this document, for all purposes.

BACKGROUND OF THE INVENTION

1. Field of Invention

The present invention, in general, relates to methods for the formation of optical crystal layers and, in particular, to methods for the formation of thin optical crystal layers on a substrate.

2. Description of the Related Art

Conventional electro-optical devices (e.g., optical switches, optical modulators, optical polarizers, optical amplifiers, optical lasers, etc.) are manufactured using bulk optical crystal layers (e.g., a lithium niobate [$LiNbO_3$] single crystal wafer) with a thickness of at least 1 mm overlying a substrate. The manufacturing of such conventional electro-optical devices often includes forming waveguide regions in the bulk optical crystal layer using titanium diffusion or proton exchange and coating the bulk optical crystal layer with a dielectric buffer layer (e.g., a silicon dioxide [$SiO_2$] buffer layer). Although they have become widely accepted, the conventional electro-optical devices can suffer such drawbacks as large Radio-Frequency (RF) and optical wave velocity mismatch and the inability to provide a broad bandwidth at a low modulation or switching voltage.

Various thin ferroelectric optical crystal layer preparation methods, including RF-sputtering, ion beam sputtering, pulsed laser deposition, metal-organic Chemical Vapor Deposition (CVD), Plasma-Enhanced CVD, epitaxial and sol-gel methods, have been investigated as alternatives to the use of bulk optical crystal substrates in electro-optical device manufacturing. However, each of these methods has been ineffective in producing a thin optical crystal layer with the electro-optical coefficient, surface quality, homogeneity and single crystal structure required for use in electro-optical devices.

In the field of semiconductor manufacturing, methods are known for the formation of a thin single crystal silicon layer on a silicon dioxide layer overlying a silicon wafer. These methods involve implanting ions into a silicon substrate to define a thin single crystal silicon layer thereon. The thin single crystal silicon layer is then bonded to a silicon dioxide layer overlying a silicon wafer. A thin single crystal silicon layer, silicon dioxide layer and silicon wafer structure is subsequently separated from the silicon substrate with a high temperature anneal. Such methods, however, are not suitable for the formation of a thin optical crystal layer due to the required high bond strength of optical crystal materials. In addition, the high temperature anneal is incompatible with forming a thin optical crystal layer on a substrate with mismatched thermal expansion characteristics.

Still needed in the field of electro-optical devices, therefore, is a method for the formation of a thin optical crystal layer with characteristics (e.g., electro-optical coefficient, surface quality, homogeneity and single crystal structure) that are suitable for use in electro-optical devices. In addition, the method should form the thin optical crystal layer in a configuration that enables the manufacturing of electro-optical devices with a reduced RF and optical wave velocity mismatch, a broad bandwidth and a low modulation or switching voltage.

SUMMARY OF THE INVENTION

The present invention provides a method for the formation of a thin optical crystal layer with characteristics that are suitable for use in, and in a configuration that enables the manufacturing of, electro-optical devices with a reduced RF and optical wave velocity mismatch, a broad bandwidth and a low modulation or switching voltage.

A method according to the present invention forms a thin optical crystal layer (e.g., a thin $LiNbO_3$ optical single crystal layer) overlying a low dielectric constant substrate (e.g., a low dielectric constant glass substrate). The thin optical crystal layer has characteristics (e.g., electro-optical coefficient, surface quality, homogeneity, single crystal structure, etc.) that are equivalent to a bulk optical crystal and is, thus, suitable for use in electro-optical devices. Furthermore, the method forms the thin optical crystal layer in a configuration (i.e., overlying a low dielectric constant substrate) that enables the manufacturing of electro-optical devices with a reduced RF and optical wave velocity mismatch, a broad bandwidth and a low modulation or switching voltage.

Processes in accordance with the present invention include first implanting ions (e.g., $He^+$ ions) into an optical crystal substrate (e.g., a $LiNbO_3$ optical single crystal wafer). The implanted ions define, in the optical crystal substrate, a thin ion-implanted optical crystal layer overlying a bulk optical crystal substrate. A low dielectric constant substrate is subsequently bonded to the optical crystal substrate, using either a direct or an indirect bonding technique, to form a bonded structure. The bonded structure is thermally annealed at a temperature in the range of 300° C. to 600° C. for 30 minutes to 300 minutes. The thin ion-implanted optical crystal layer and the low dielectric constant substrate are subsequently separated from the bulk optical crystal substrate by applying mechanical force to the low dielectric constant substrate and/or bulk optical crystal substrate in the direction of separation. This separation results in the formation of a thin optical crystal layer overlying a low dielectric constant substrate.

A better understanding of the features and advantages of the present invention will be obtained by reference to the following detailed description that sets forth illustrative embodiments, in which the principles of the invention are utilized, and the accompanying drawings.

DETAILED DESCRIPTION OF THE INVENTION

To be consistent throughout the present specification and for clear understanding of the present invention, the following definition is hereby provided for a term used therein:

The term "low dielectric constant substrate" refers to a substrate with a dielectric constant less than that of an overlying thin optical crystal layer formed according to the present invention.

Figure 1A:
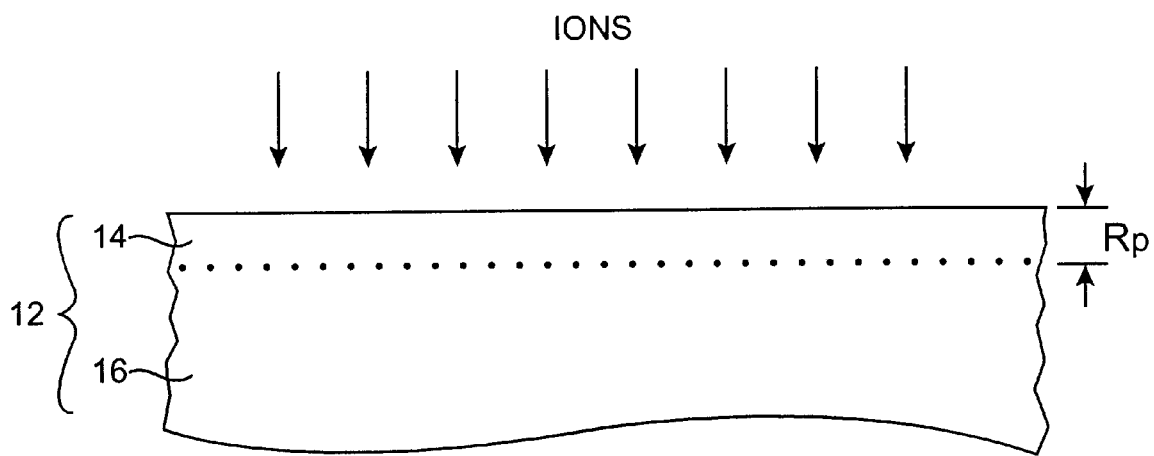
FIGS. 1A–1C are cross-sectional views illustrating steps in a process according to one exemplary embodiment of the present invention.
Figure 1B:
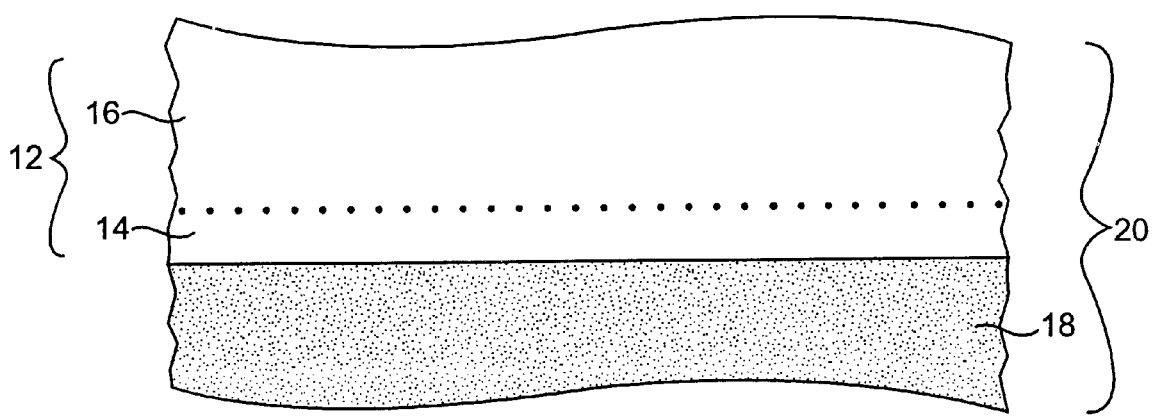
Figure 1C:
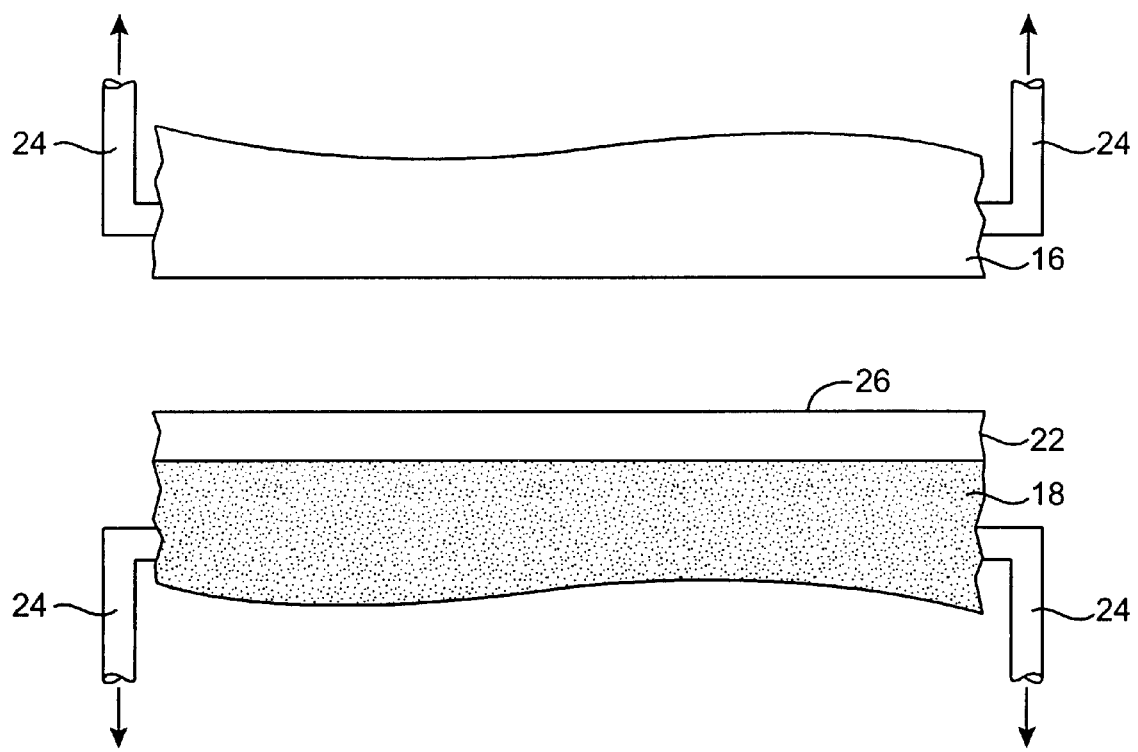

FIGS. 1A–1C illustrate the sequence of steps for the formation of a thin optical crystal layer overlying a low dielectric constant substrate in a process according to one exemplary embodiment of the present invention. The process includes first implanting ions into an optical crystal substrate 12, as illustrated in FIG. 1A, where the arrows indicate the direction of ion travel during implantation. The implanted ions define, in the optical crystal substrate 12, a thin ion-implanted optical crystal layer 14 overlying a bulk optical crystal substrate 16.

Optical crystal substrate 12 can be, for example, a ferroelectric optical crystal substrate, such as a lithium niobate ($LiNbO_3$) optical single crystal wafer. Other optical crystal substrates known to one skilled in the art can also be employed, including but not limited to barium borate (BBO), lithium tantalate ($LiTaO_3$), barium titanate ($BaTiO_3$), potassium niobate ($KNbO_3$), potassium dihydrogen phosphate (KDP), strontium barium niobate, lead barium niobate, and potassium sodium strontium barium niobate optical crystal substrates. Optical crystal substrate 12 can also be a $LiNbO_3$ optical crystal substrate that has been doped with erbium (Er), neodymium (Nd) or other laser species known in the art, as well as magnesium oxide (MgO), iron (Fe), zinc (Zn) and titanium (Ti).

Any ion known to one skilled in the art that does not significantly alter the electrical characteristics of optical crystal substrate 12 can be implanted. The size and electrochemical characteristics of the ions determine the degree of lattice distortion that will occur in optical crystal substrate 12 and are, therefore, factors in selecting the ion to be implanted. It is preferred that the implanted ions be noble gas ions, in order to minimize any chemical reaction between the implanted ions and optical crystal substrate 12. Among the noble gas ions, helium ions ($He^+$) are preferred since helium is the lightest (i.e., lowest molecular weight) noble gas and will, therefore, penetrate farther into optical crystal substrate 12 than other noble gas ions for a given implantation energy.

The implantation energy determines the depth (i.e., projected range [Rp] depicted in FIG. 1A) that the ions penetrate into optical crystal substrate 12. One skilled in the art will recognize that there is a distribution of penetration depths about the projected range. The projected range, however, serves to define the thickness of thin ion-implanted optical crystal layer 14. For a $LiNbO_3$ optical single crystal substrate (e.g., a Z-cut $LiNbO_3$ optical single crystal wafer), the implantation energy can be in the range of 200 KeV to 3600 KeV to define a thin ion-implanted optical crystal layer with a thickness from less than 1 micron to a few microns. For example, at an implantation energy of 500 KeV, helium ions ($He^+$) will penetrate to a depth of approximately 1.4 microns in a $LiNbO_3$ optical single crystal substrate and, thus, define a thin ion-implanted optical crystal layer with a thickness of approximately 1.4 microns.

The ion dose will determine the degree of lattice distortion and/or micro-damage (e.g., point defects) at the projected range (Rp). Lower doses will result in less distortion or micro-damage. The ion dose is, therefore, selected to optimize the degree of lattice distortion and/or micro-damage and thereby contribute to the ability to separate the thin ion-implanted optical crystal layer from the bulk optical crystal substrate during a subsequent separation step (described below). A typical helium ion dose for implantation into a $LiNbO_3$ optical single crystal substrate is $5 \times 10^{16}$ ions/cm$^2$.

If desired to minimize ion channeling during the ion implantation step, the ions can be implanted at an angle of, for example, 5° with respect to the normal of optical crystal substrate 12 surface. Furthermore, to avoid unwanted damage to the crystal structure of thin ion-implanted optical crystal layer 14, it is preferred that a low implantation current density of, for example, less than 1.0 $\mu A/cm^2$ be employed. During the ion implantation, the temperature of optical crystal substrate 12 is maintained at less than 350° C., in order to control the formation of point defect clusters and complexes in optical crystal substrate 12.

Next, a low dielectric constant substrate 18 is bonded to optical crystal substrate 12 to form a bonded structure 20, as illustrated in FIG. 1B. In the exemplary embodiment illustrated in FIGS. 1A–1C, the bonding step is accomplished using a direct bonding technique. In such a direct bonding technique, low dielectric constant substrate 18 is directly bonded to optical crystal substrate 12 using a thermal diffusion process. However, the bonding can also be accomplished using an indirect bonding technique, as discussed below with respect to FIGS. 3A–3C. A suitable direct bonding technique can include, for example, heating optical crystal substrate 12 and low dielectric constant substrate 18 at 300° C. for 2 hours under a pressure of 100N. Improved bonding can be achieved if both surfaces to be bonded together are cleaned and optically polished to a surface roughness of less than 10 angstroms.

Low dielectric constant substrate 18 can be any suitable low dielectric constant optical materials known in the art including, for example, a low dielectric constant glass substrate or a low dielectric constant fused quartz substrate. It is expected that the thin optical crystal layer overlying a low dielectric constant substrate that is formed by this exemplary process will be used in the manufacturing of electro-optical devices that include a waveguide region. It is, therefore, preferred that low dielectric constant substrate 18 have a refractive index that is lower than the refractive index of ion-implanted thin optical crystal layer 14, a low absorption loss and thermal characteristics that are matched to the optical crystal substrate 12. For example, for a $LiNbO_3$ optical crystal substrate, a low dielectric constant B270 optical glass substrate can be employed since B270 optical glass has a refractive index of 1.5341 (compared to a refractive index in the range of 2.2–2.3 for $LiNbO_3$) and a thermal expansion coefficient (dl/dT) of $9.6 \times 10^{-6}$ $K^{-1}$, which is close to the thermal expansion coefficient of $LiNbO_3$ (i.e., a [dl/dT] of $15 \times 10^{-6}$ $K^{-1}$ along the x- and y-axes and a [dl/dT] of $4 \times 10^{-6}$ $K^-$along the z-axis). Employing a low dielectric constant substrate that also has a low refractive index provides the benefit of an improved optical confinement capability.

Next, bonded structure 20 is thermally annealed at a temperature in the range of 300° C. to 600° C. for 30 minutes to 300 minutes. The thermal annealing serves to expand the implanted gas ions and, thus, weaken and/or break the bonds between thin ion-implanted optical crystal layer 14 and bulk optical crystal substrate 16. The thermal annealing at the temperature range of 300° C. to 600° C. and for the time period of 30 minutes to 300 minutes avoids stress induced damage due to thermal expansion mismatches between optical crystal substrate 12 and low dielectric constant substrate 18, while still providing the required weakening and/or breaking of the bonds. If desired, the weakening and/or breaking of the bonds in this thermal annealing step can be accelerated by pre-annealing thin ion-implanted optical crystal layer 14 and bulk crystal substrate 16 step at, for example, 600° C. for 30 minutes prior to the bonding step.

Next, thin ion-implanted optical crystal layer 14 and low dielectric constant substrate 18 are separated from bulk optical crystal substrate 16 by applying mechanical force to low dielectric constant substrate 18 and/or bulk optical crystal substrate 16 in the direction of separation. A result of the separation is a thin optical crystal layer 22 (for which thin ion-implanted optical crystal layer 14 served as a precursor) overlying low dielectric constant substrate 18, as shown in FIG. 1C, where the arrows indicate the direction of separation and application of mechanical force. The application of mechanical force is required to induce the separation since optical crystal materials have a relatively high bond strength in comparison to, for example, semiconductor crystals (e.g., silicon). This relatively high bond strength is not completely overcome by the implanting and thermal annealing steps, hence a mechanical separation step is required. The mechanical force is typically applied in a direction of separation that is perpendicular to the surface of optical crystal substrate 14. The mechanical force can be applied, for example, by clamping low dielectric constant substrate 18 and bulk optical crystal substrate 16 and pulling them apart (see clamps 24 in FIG. 1C). A typical mechanical force used to induce the separation is around 0.5 N/cm .

To reduce surface micro-roughness, an exposed surface 26 of thin optical crystal layer 22 can be polished using, for example, conventional optical crystal chemical mechanical polishing techniques. If desired, thin optical crystal layer 22 can be patterned to form a patterned thin optical crystal layer using photolithography and etching techniques.

Figure 2:
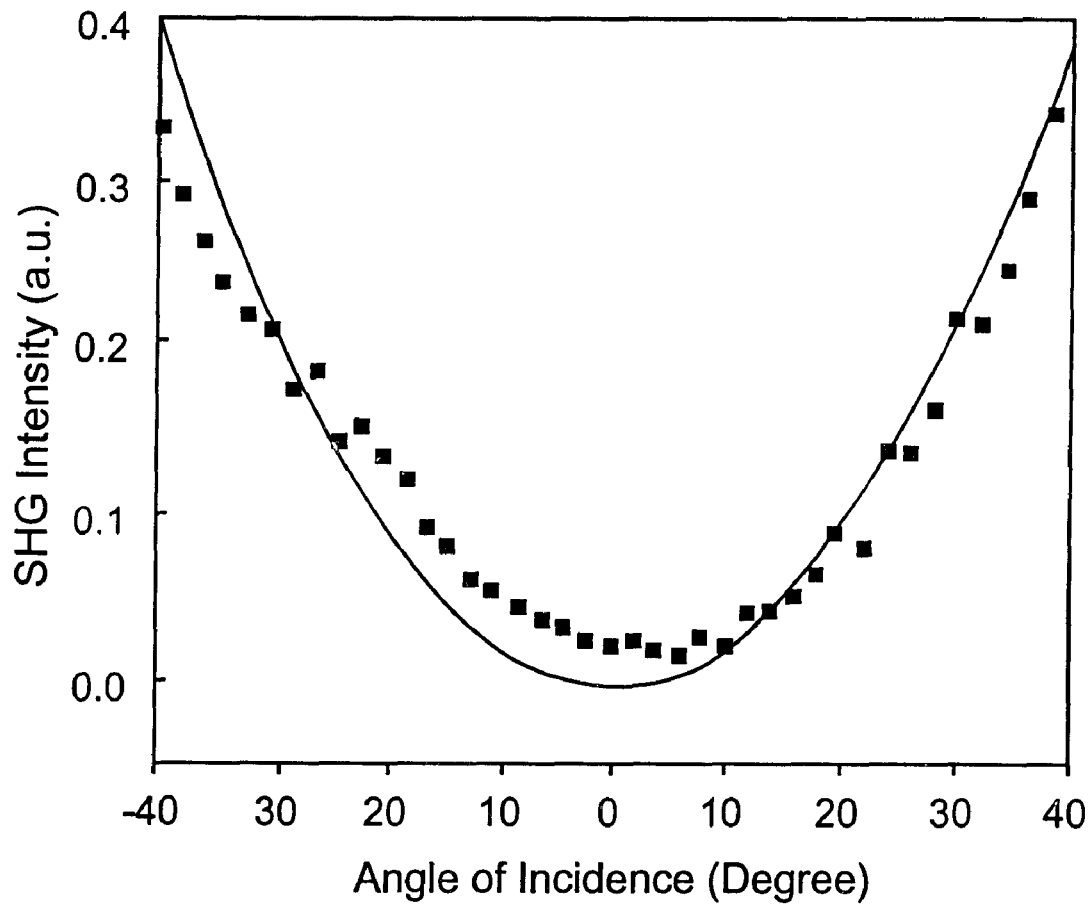
FIG. 2 is a graph of the second harmonic generation (SHG) intensity versus angle of incidence for a thin (1.3 micron) Z-cut $LiNbO_3$ optical crystal layer overlying a low dielectric constant glass substrate formed by the process of FIGS. 1A–1C.

FIG. 2 is a graph of theoretical and experimentally measured Second Harmonic Generation (SHG) intensity values versus angle of incidence for a fundamental 1.06 $\mu$m wavelength laser applied to a thin optical crystal layer overlying a low dielectric substrate formed by the exemplary embodiment process of FIGS. 1A–1C. The subject thin optical crystal layer was a Z-cut $LiNbO_3$ (i.e., $LiNbO_3$ cut along the direction of the Z-crystal axis) thin optical crystal layer with a thickness of 1.3 microns and the subject low dielectric constant substrate was a low dielectric constant glass substrate with a thickness of 1 mm. The theoretical values of FIG. 2 are based on the assumption that the electro-optical coefficient values of the Z-cut $LiNbO_3$ thin optical crystal layer are identical to that of a bulk Z-cut $LiNbO_3$ optical crystal substrate. The theoretical and experimentally measured values of FIG. 2 are in good agreement, indicating that thin optical crystal layers formed by processes in accordance with exemplary embodiments of the present invention retain the characteristics needed for use in the manufacturing of electro-optical devices.

Drawbacks of conventional electro-optical devices with a waveguide region and that are manufactured using bulk optical crystal substrates include RF and optical wave velocity mismatch and the inability to provide a broad bandwidth at a low modulation or switching voltage. The key to eliminating these drawbacks is the provision of a low dielectric constant region in the vicinity of the waveguide region. Since methods in accordance with the present invention form a thin optical crystal layer overlying a low dielectric constant layer, the methods enable the manufacturing of electro-optical devices with a reduced RF and optical wave velocity mismatch, a broad bandwidth and a low modulation or switching voltage. For example, the presence of a low dielectric constant substrate leads to an improved RF and optical wave velocity match without the use of a conventional $SiO_2$ buffer layer. In addition, the use of a low dielectric constant substrate that also has a low dielectric loss will provide for a desirable small RF propagation loss.

Figure 3A:
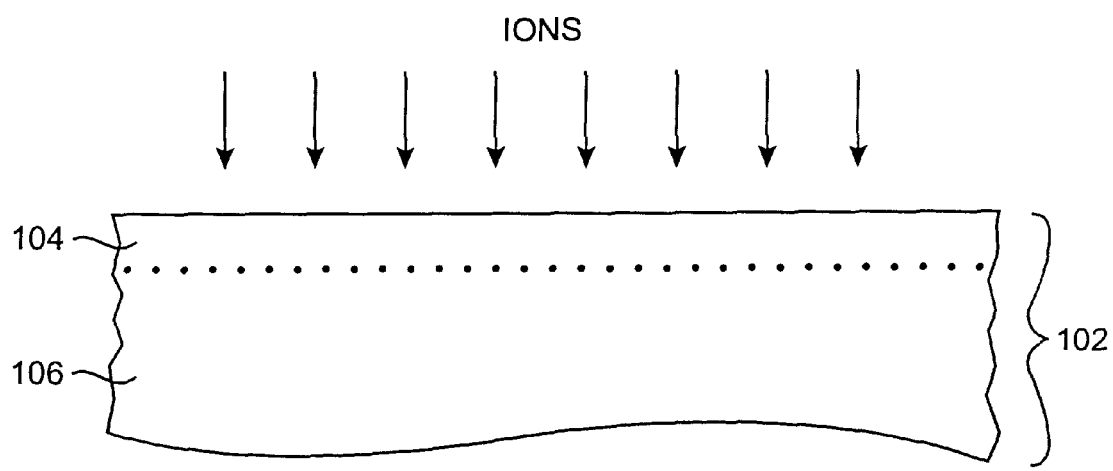
FIGS. 3A–3C is a cross-sectional view illustrating steps in a process according to another exemplary embodiment of the present invention.
Figure 3B:
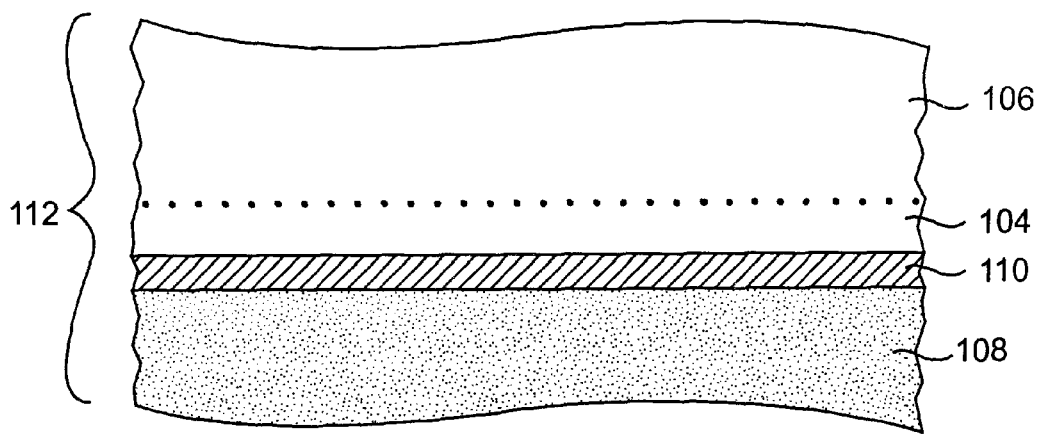
Figure 3C:
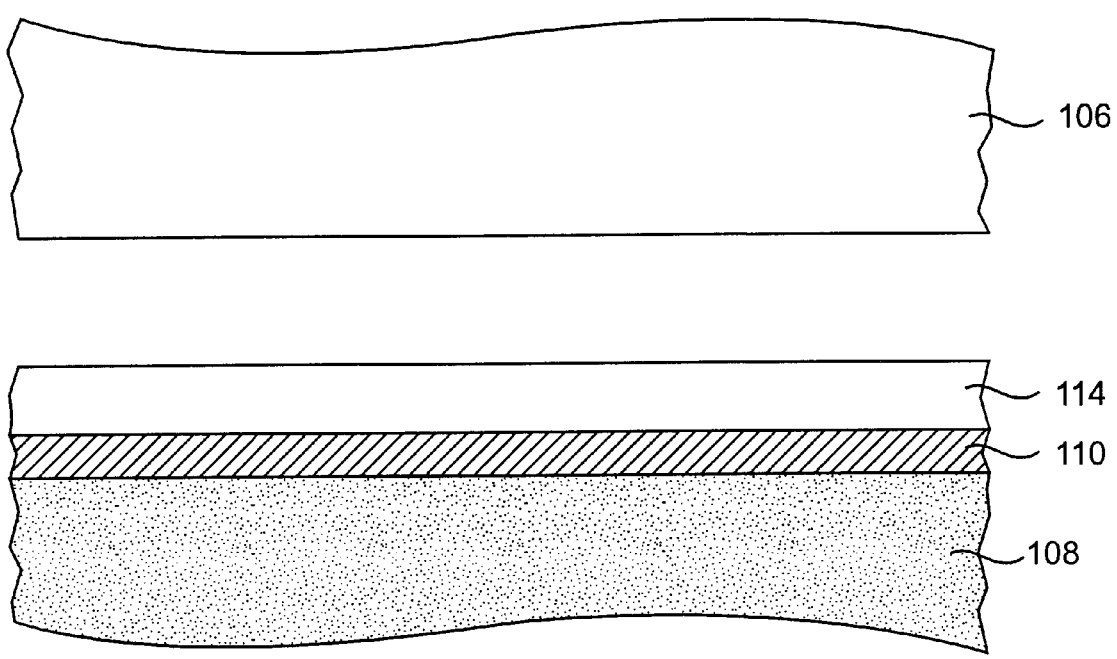

FIGS. 3A–3C illustrate steps in a process according to another exemplary embodiment of the present invention. As previously mentioned, as an alternative to direct bonding, an indirect bonding technique can be used to bond a low dielectric constant substrate to an optical crystal substrate. Such indirect bonding techniques use an intermediate bonding layer such as a BCB adhesive (i.e., Cyclotene 3022-35 adhesive) layer, spin-on-glass layer or optical-grade epoxy to achieve bonding. The process includes first implanting ions into an optical crystal substrate 102 (see FIG. 3A). The implantation of the ions defines, in the optical crystal substrate 102, a thin ion-implanted optical crystal layer 104 overlying a bulk optical crystal substrate 106. A low dielectric constant substrate 108 is then bonded to optical crystal substrate 102 using an indirect bonding technique. The indirect bonding technique utilizes intermediate layer 110 to form a bonded structure 112. A variety of materials can be used to form intermediate layer 110, including BCB adhesive, a spin-on-glass or an optical-grade epoxy. The refractive index and dielectric constant of the material used to form intermediate layer 110 should be lower than the refractive index of the optical crystal substrate 102.

The indirect bonding technique can be accomplished, for example, by first priming (i.e., spin coated) the surface of optical crystal substrate 102 with an adhesive promoter (e.g., by employing an adhesive promoter application step with a spin speed of 500 rpm followed by a drying step with a spin speed of 2500 rpm for 20 seconds), followed by immediate spin coating of a BCB adhesive layer thereon. The spin coating can be accomplished, for example, using a BCB dispense step with a spin speed of 100 rpm, followed by a BCB coating step with a spin speed of 500 rpm for 8 seconds and then 2000 rpm for 30 seconds to create a BCB adhesive layer with a thickness of 1.7 microns. The low dielectric constant substrate 108 is also coated with a BCB adhesive layer using the same technique. Both low dielectric constant substrate 108 and optical crystal substrate 102 are subsequently soft cured at 200° C. for 1 hour in a nitrogen ambient with less than 100 ppm oxygen ($O_2$). Low dielectric constant substrate 108 and optical crystal substrate 102 are then indirectly bonded, as shown in FIG. 3B, such that the BCB adhesive layers coated thereon combine to form a single BCB adhesive intermediate layer 110. This combination can be accomplished, for example, at a temperature of 250° C. for 1 hour in an $O_2$ free over pressure ambient.

Next, bonded structure 112 is thermally annealed at a temperature in the range of 300° C. to 400° C. for 30 minutes to 300 minutes. The thermal anneal at temperature range of 300° C. to 400° C. and time period of 30 minutes to 300 minutes avoids stress induced damage due to thermal expansion mismatches between the optical crystal substrate and the low dielectric constant substrate, as well as degradation of intermediate layer 110.

Next, thin ion-implanted optical crystal layer 104, low dielectric constant substrate 108 and intermediate layer 110 are separated from bulk optical crystal substrate 106 by applying mechanical force to low dielectric constant substrate 108 and/or bulk optical crystal substrate 106 in the direction of separation, as illustrated in FIG. 3C. A result of the separation is a thin optical crystal layer 114 (for which ion implanted optical crystal layer 104 served as a precursor) overlying low dielectric constant substrate 108.

It should be understood that various alternatives to the embodiments of the invention described herein may be employed in practicing the invention. It is intended that the following claims define the scope of the invention and that methods within the scope of these claims and their equivalents be covered thereby.

What is claimed is:

1. A method for the formation of a thin optical crystal layer overlying a low dielectric constant substrate comprising:

implanting ions into an optical crystal substrate, thereby defining therein, a thin ion-implanted optical crystal layer overlying a bulk optical crystal substrate;

bonding a low dielectric constant substrate to the ion-implanted optical crystal layer to form a bonded structure;

thermally annealing the bonded structure at a temperature in the range of 300° C. to 600° C. for 30 minutes to 300 minutes; and separating the thin ion-implanted optical crystal layer and low dielectric constant substrate from the bulk optical crystal substrate by applying mechanical force in the direction of separation, thereby forming a thin optical crystal layer overlying a low dielectric constant substrate.

2. The method of claim 1, further comprising, during the implanting step, implanting noble gas ions.

3. The method of claim 1, further comprising, during the implanting step, implanting helium ions.

4. The method of claim 3 wherein the implanting step includes implanting helium ions at a dose of $5 \times 10^{16}$ ions/cm$^2$ at an implantation energy of 500 KeV.

5. The method of claim 1, further comprising, during the implanting step, implanting ions into a ferroelectric optical crystal substrate.

6. The method of claim 5, further comprising, during the implanting step, implanting ions into a lithium niobate optical crystal substrate.

7. The method of claim 6, further comprising, during the implanting step, implanting ions into a lithium niobate optical crystal substrate doped with erbium.

8. The method of claim 6, further comprising, during the implanting step, implanting ions into a lithium niobate optical crystal substrate doped with neodymium.

9. The method of claim 1, wherein the bonding step employs a direct bonding technique.

10. The method of claim 1, wherein the bonding step employs an indirect bonding technique.

11. The method of claim 1, wherein the bonding step employs an indirect bonding technique that uses a BCB adhesive intermediate layer.

12. The method of claim 1, further comprising, during the bonding step, bonding a low dielectric constant glass substrate.

13. The method of claim 1, further comprising, during the bonding step, bonding a low dielectric constant fused quartz substrate.

14. The method of claim 1, further comprising, during the separation step, applying mechanical force in the direction of separation which is perpendicular to a surface of the optical crystal substrate.

15. The method of claim 14, further comprising, during the separation step, clamping the low dielectric substrate and the bulk optical crystal substrate.

16. The method of claim 15, further comprising, during the separation step, applying mechanical force in the range of from 0.3 N/cm$^2$ to 1.0 N/cm$^2$.

17. The method of claim 1, wherein the separating step forms a thin optical crystal layer with a thickness in the range of 1 micron to 10 microns overlying a low dielectric constant substrate.

18. The method of claim 1, further comprising, after the separating step, a step of polishing a surface of the thin optical crystal layer.

19. The method of claim 1, further comprising, after the separating step, a step of patterning the thin optical crystal layer to form a patterned thin optical crystal layer.

20. The method of claim 19, wherein the patterning step employs photolithography and etching techniques.

21. A method for the formation of a thin LiNbO$_3$ optical single crystal layer overlying a low dielectric constant substrate comprising:

implanting helium ions into a LiNbO$_3$ optical single crystal wafer, thereby defining, in the LiNbO$_3$ optical single crystal wafer, a thin ion-implanted optical crystal layer overlying a bulk optical crystal substrate;

bonding a low dielectric constant substrate to the LiNbO$_3$ optical single crystal wafer to form a bonded structure;

thermally annealing the bonded structure at a temperature in the range of 300° C. to 600° C. for 30 minutes to 300 minutes; and separating the thin ion-implanted optical crystal layer and low dielectric constant substrate from the bulk optical crystal substrate by applying mechanical force in the direction of separation, thereby forming a thin LiNbO$_3$ optical single crystal layer overlying a low dielectric constant substrate.

22. The method of claim 21, further comprising, during the bonding step, bonding a low dielectric constant glass substrate.

23. The method of claim 21, further comprising, during the bonding step, bonding a low dielectric constant fused quartz substrate.

24. The method of claim 21, further comprising, during the implanting step, implanting helium ions into a LiNbO$_3$ optical single crystal wafer doped with erbium.

25. The method of claim 21, further comprising, during the implanting step, implanting helium ions into a LiNbO$_3$ optical single crystal wafer doped with neodymium.

* * * * *